US006983881B2

(12) United States Patent
Chien

(10) Patent No.: US 6,983,881 B2
(45) Date of Patent: Jan. 10, 2006

(54) BANKNOTE RECEIVER FOR TICKET VENDOR

(75) Inventor: Tien-Yuan Chien, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 187 days.

(21) Appl. No.: 10/620,428

(22) Filed: Jul. 17, 2003

(65) Prior Publication Data

US 2004/0200893 A1 Oct. 14, 2004

(30) Foreign Application Priority Data

Apr. 14, 2003 (TW) .............................. 92205787 U

(51) Int. Cl.
*G06K 5/00* (2006.01)

(52) U.S. Cl. ....................................... 235/380; 235/379

(58) Field of Classification Search ................ 235/380, 235/379; 902/9; 271/176, 181

See application file for complete search history.

(56) References Cited

U.S. PATENT DOCUMENTS

| | | | | |
|---|---|---|---|---|
| 5,505,439 | A * | 4/1996 | Watabe et al. | 271/177 |
| 5,641,157 | A * | 6/1997 | Mays et al. | 271/181 |
| 2003/0137095 | A1 * | 7/2003 | Ito et al. | 271/176 |

FOREIGN PATENT DOCUMENTS

| | | | |
|---|---|---|---|
| JP | 4131269 | * | 5/1995 |

* cited by examiner

*Primary Examiner*—Diane I. Lee
*Assistant Examiner*—Seung H Lee

(57) ABSTRACT

A banknote receiver for use in a ticket vending machine, money exchange machine, or the like is constructed to include a housing with a banknote insertion slot, a detector unit formed of an upper base and a lower base and mounted in the housing and adapted to scan the authenticity of banknote inserted into the banknote insertion slot, the detector unit defining an angled passage between the upper base and the lower base for guiding inserted banknote away from the banknote insertion slot to the banknote storage cabinet, and a banknote storage cabinet adapted to receive verified banknote, the banknote storage cabinet having a spring member suspending in the banknote inlet thereof and adapted to prohibit reverse movement of received banknote.

20 Claims, 7 Drawing Sheets

BANKNOTE RECEIVER FOR TICKET VENDOR

BACKGROUND OF THE INVENTION

1. Field of the Invention

The present invention relates to a banknote receiving system for use in a ticket vending machine, money exchange machine, or the like and, more particularly to such a banknote receiver, which effectively prohibits people from pulling back inserted banknote.

2. Description of the Related Art

FIG. 5 illustrates a prior art banknote receiver for use in a ticket vending machine, money exchange machine, or the like. According to this design, the banknote receiver comprises a housing C with a banknote insertion slot C1, a transmission mechanism E installed in the housing C and adapted to transfer inserted banknote away from the banknote insertion slot C1 to a banknote passage C2 and then a banknote storage cabinet (not shown), and a circuit board D installed in the housing C and adapted to detect the authenticity of inserted banknote. The housing C comprises a toothed safety plate F provided at the banknote passage C2 and adapted to prohibit backward movement of inserted banknote. This design of banknote receiver is still not satisfactory in function. If inserted banknote is pulled backwards with a metal string or an external body, inserted banknote will be torn or damaged by the toothed safety plate.

SUMMARY OF THE INVENTION

The present invention has been accomplished to provide a banknote receiver, which eliminates the aforesaid problem. It is the main object of the present invention to provide a banknote receiver, which effectively prohibits people from pulling inserted banknote backwards without causing damage to inserted banknote. It is another object of the present invention to provide a banknote receiver, which is easy and inexpensive to manufacture. According to one aspect of the present invention, the banknote receiver comprises a housing with a banknote insertion slot, a detector unit formed of an upper base and a lower base and mounted in the housing and adapted to scan the authenticity of banknote inserted into the banknote insertion slot, the detector unit defining an angled passage between the upper base and the lower base for guiding inserted banknote away from the banknote insertion slot to the banknote storage cabinet, and a banknote storage cabinet adapted to receive verified banknote, the banknote storage cabinet having a spring member suspending in the banknote inlet thereof and adapted to prohibit reverse movement of received banknote. According to another aspect of the present invention, the banknote storage cabinet has an elongated locating hole extended along the top side of the banknote inlet and adapted to accommodate the burglarproof spring member. The user can easily replace the burglarproof spring member when desired. According to still another aspect of the present invention, the burglarproof spring member can be made of resilient metal, plastics, or any of a variety of elastic materials.

DETAILED DESCRIPTION OF THE PREFERRED EMBODIMENT

Figure 1:
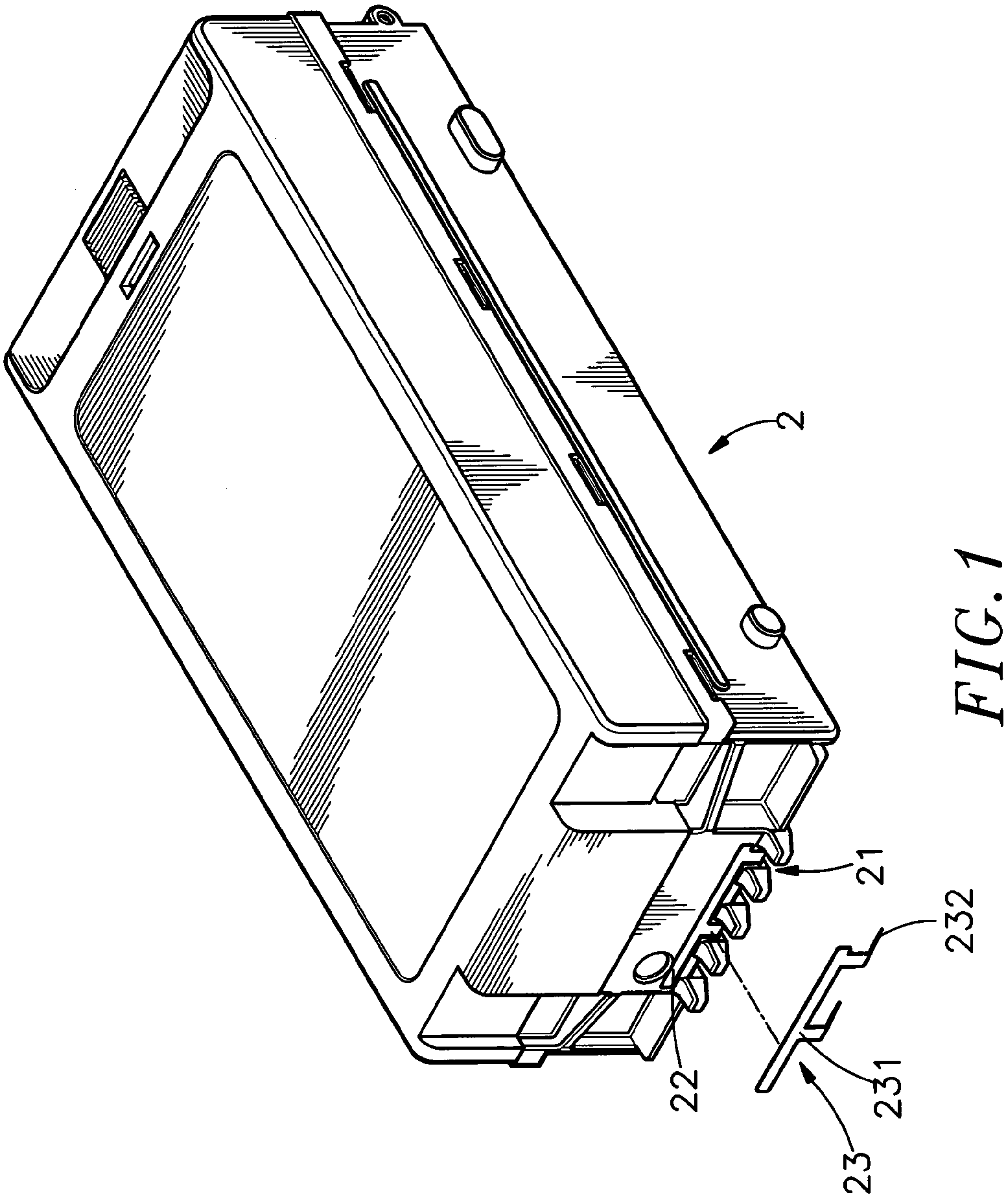
FIG. 1 is an exploded view of a banknote storage cabinet for use in a banknote receiver according to the present invention.
Figure 2:
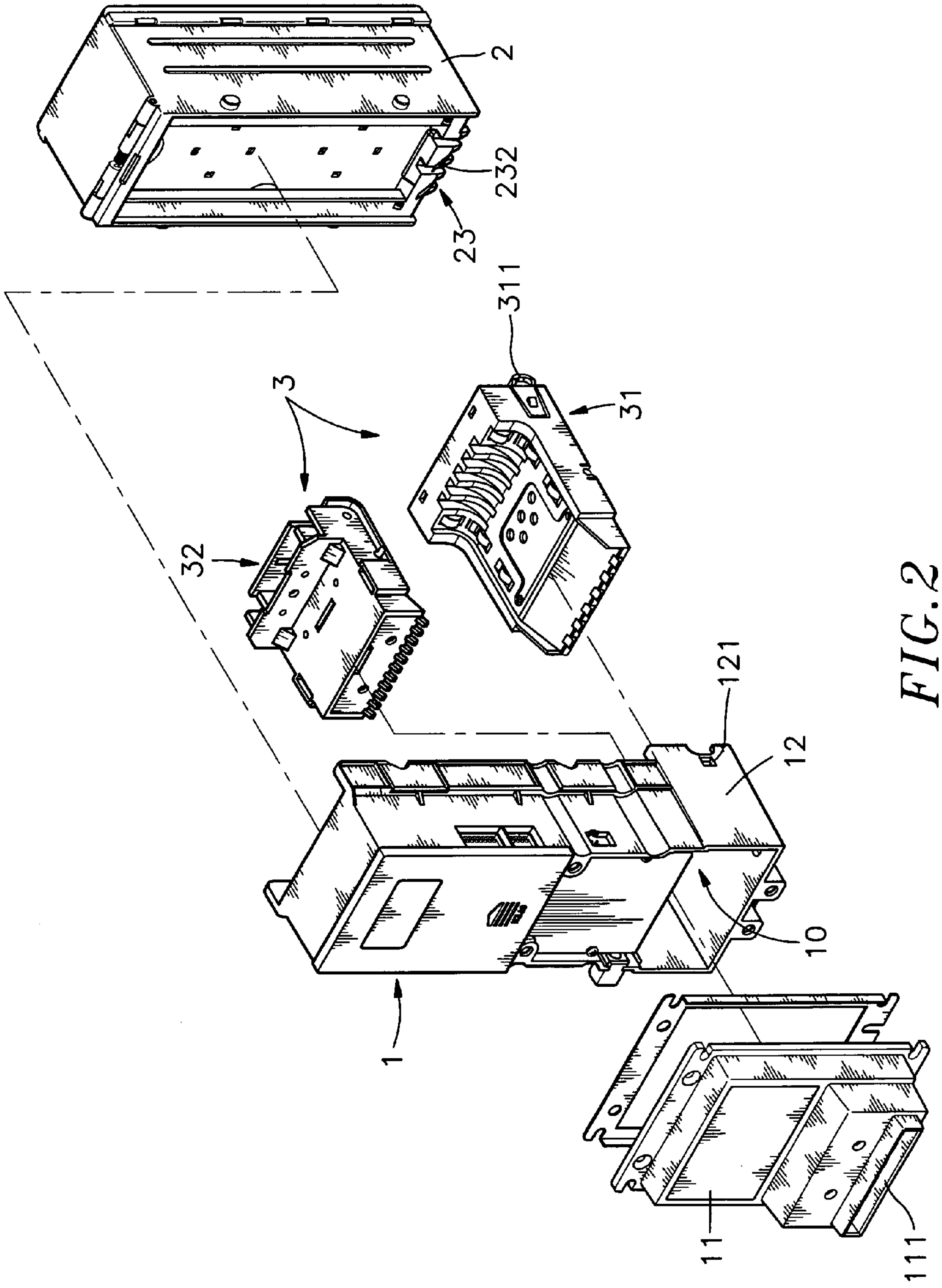
FIG. 2 is an exploded view of a banknote receiver constructed according to the present invention.
Figure 3:
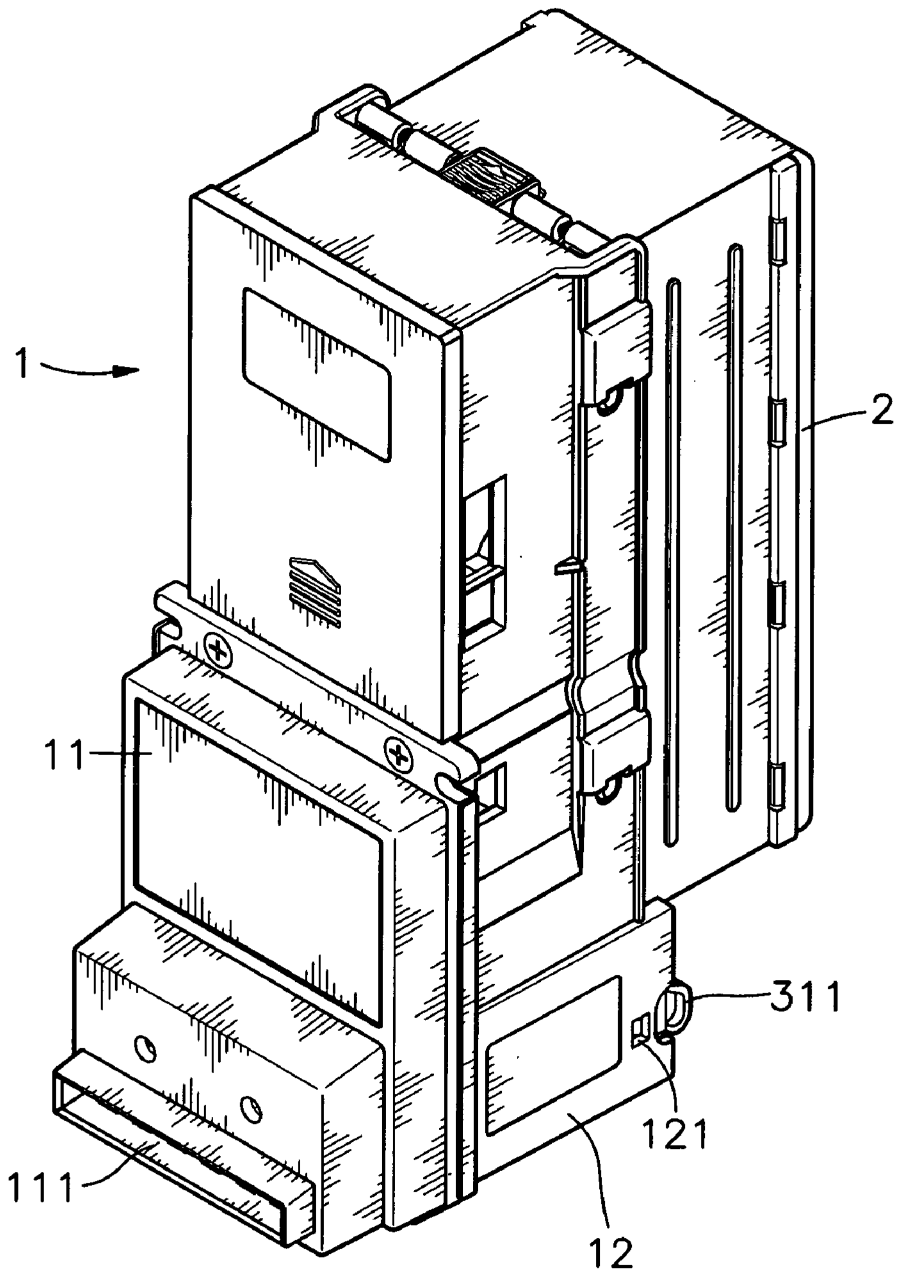
FIG. 3 is an assembly view of the banknote receiver according to the present invention.

Referring to FIGS. from 1 through 4, a banknote receiver in accordance with the present invention is shown comprised of a housing 1, a banknote storage cabinet 2, and a detector unit 3. The housing 1 is adapted to accommodating the banknote storage cabinet 2 and the detector unit 3, having a face panel 11 provided at the front side. The face panel 11 has an insertion slot 111 for entry of banknote. The detector unit 3 detects the authenticity of banknote inserted into the insertion slot 111. A conveyer 4 and a banknote impression mechanism 5 are provided inside the housing 1. The conveyer 4 comprises conveying belts 41, wheel holders 42 provided in between the conveying belts 41, and idle wheels 421 respectively pivoted to the wheel holders 42. The conveyer 4 transfers inserted banknote from an angled passage 30 to the banknote storage cabinet 2. The banknote impression mechanism 5 holds down transferred banknote for smooth delivery.

The detector unit 3 is comprised of an upper base 31 and a lower base 32. The upper base 31 comprises two spring hooks 311 provided at the rear ends of the two opposite lateral sides thereof and respectively hooked in respective hook holes 121 in the two side panels 12 of the lower chamber 10 of the housing 1. After installation in the housing 1, the upper base 31 and the lower base 32 define the aforesaid angled passage 30 for the passing of inserted banknote. The lower base 32 comprises a pivoted burglarproof hook 321 and a sensor 322 respectively disposed adjacent to the angled passage 30. The burglarproof hook 321 is controlled to stop banknote from reverse movement. The banknote storage cabinet 2 is fastened to the housing 1 remote from the face panel 11, having an elongated banknote inlet 21, an elongated locating hole 22 extended along the elongated banknote inlet 21, and a burglarproof spring member 23 mounted in the locating hole 22 and adapted to prohibit reverse movement of received banknote. The burglarproof spring member 23 comprises an elongated base 231 fastened to the locating hole 22, and curved pawls 232 suspended from the elongated base 231 and projecting into the angled passage 30 between the upper base 31 and the lower base 32 to let banknote pass in one direction to the inside of the elongated banknote inlet 21. Because the burglarproof spring member 23 is mounted in the locating hole 22 outside the banknote storage cabinet 2, the user can easily replace the burglarproof spring member 23 when desired.

Figure 4:
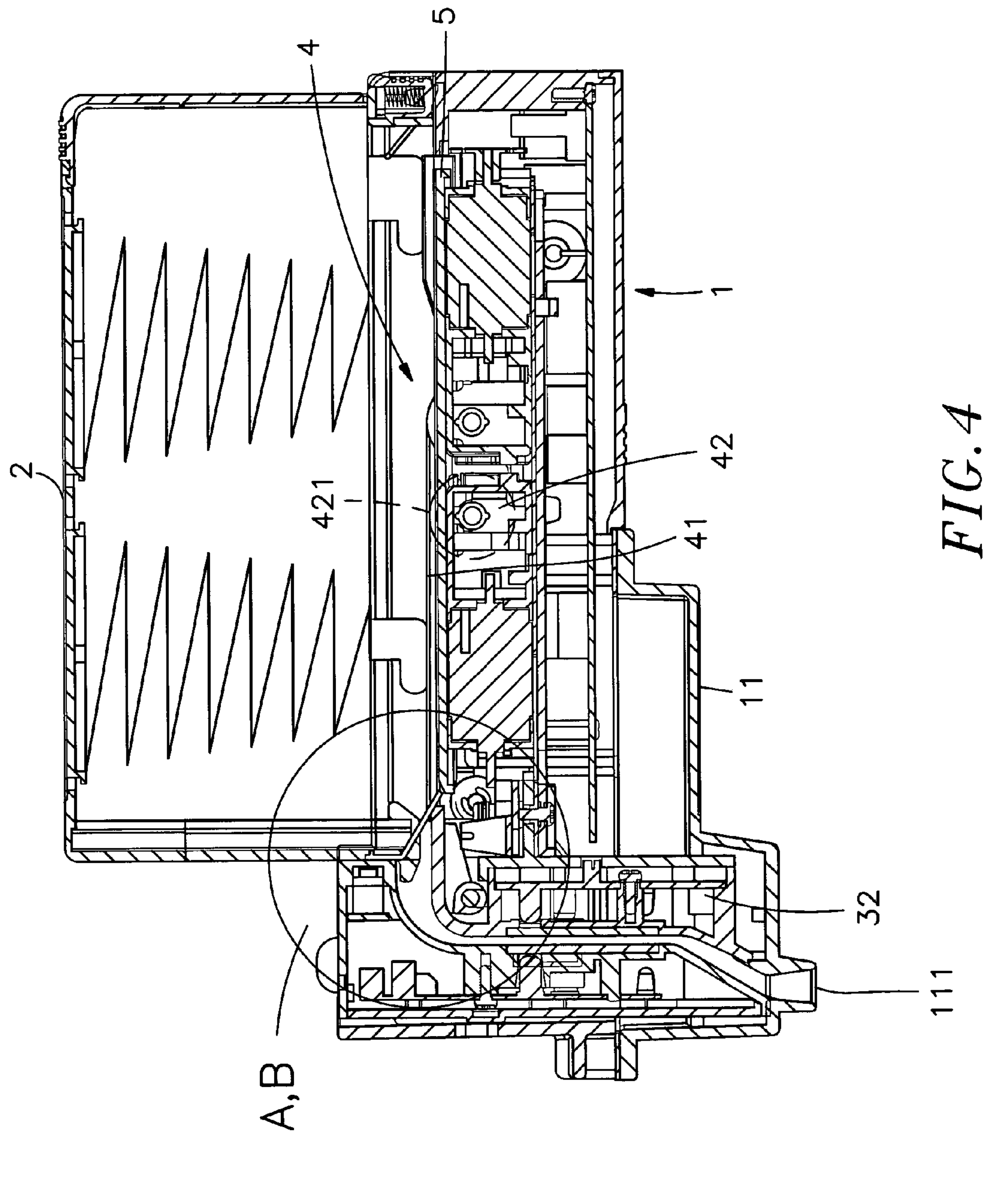
FIG. 4 is a sectional view of the banknote receiver according to the present invention.
Figure 4A:
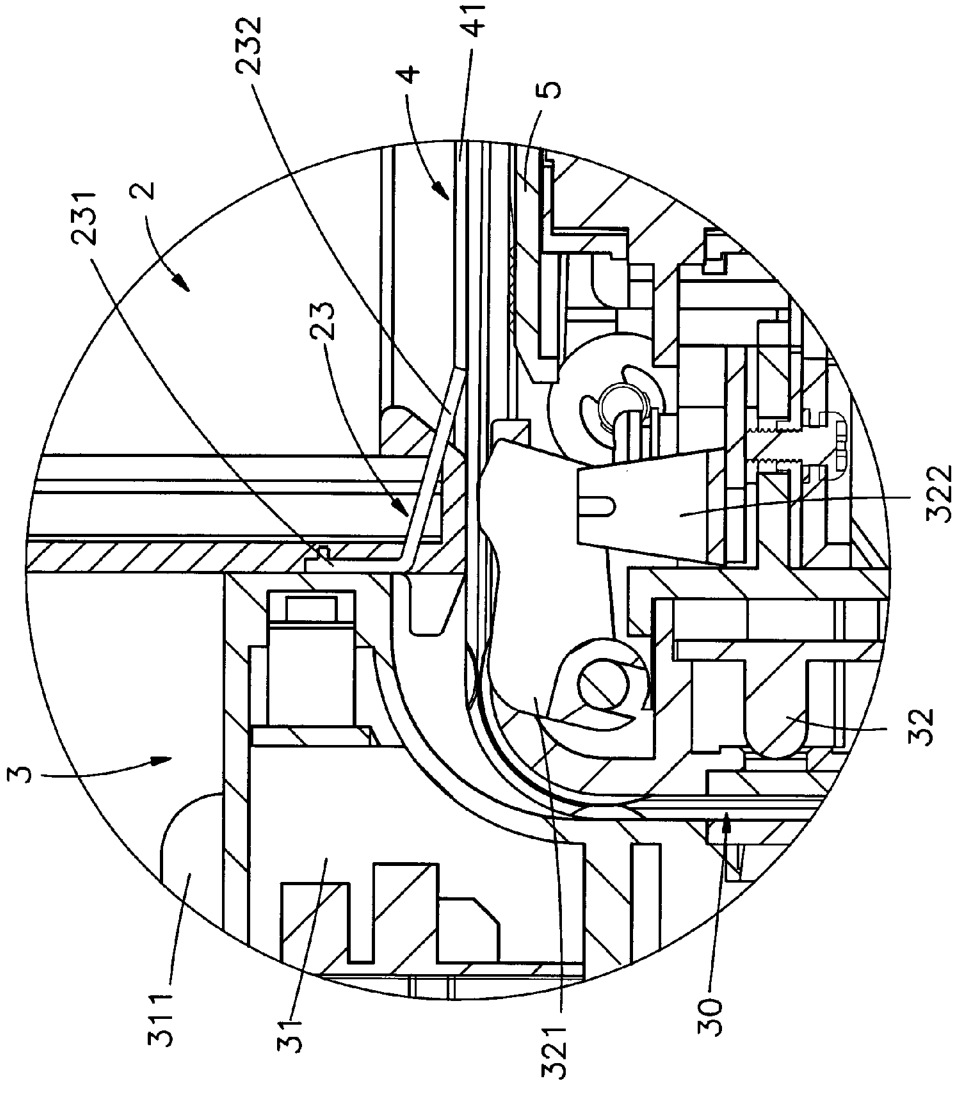
FIG. 4A is an enlarged view of a part of FIG. 4.
Figure 4B:
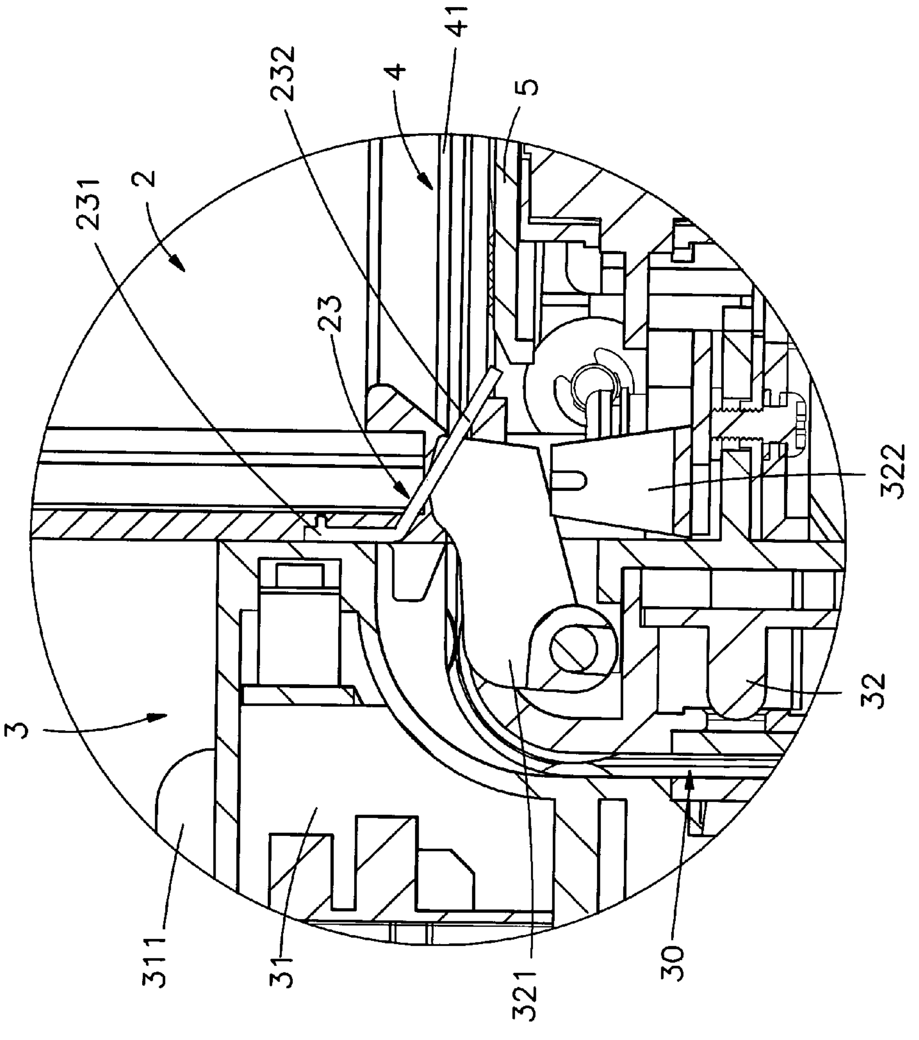
FIG. 4B is similar to FIG. 4A but showing the burglarproof hook turned to the active position and the pawls of the burglarproof spring member returned to their former shape.
Figure 5:
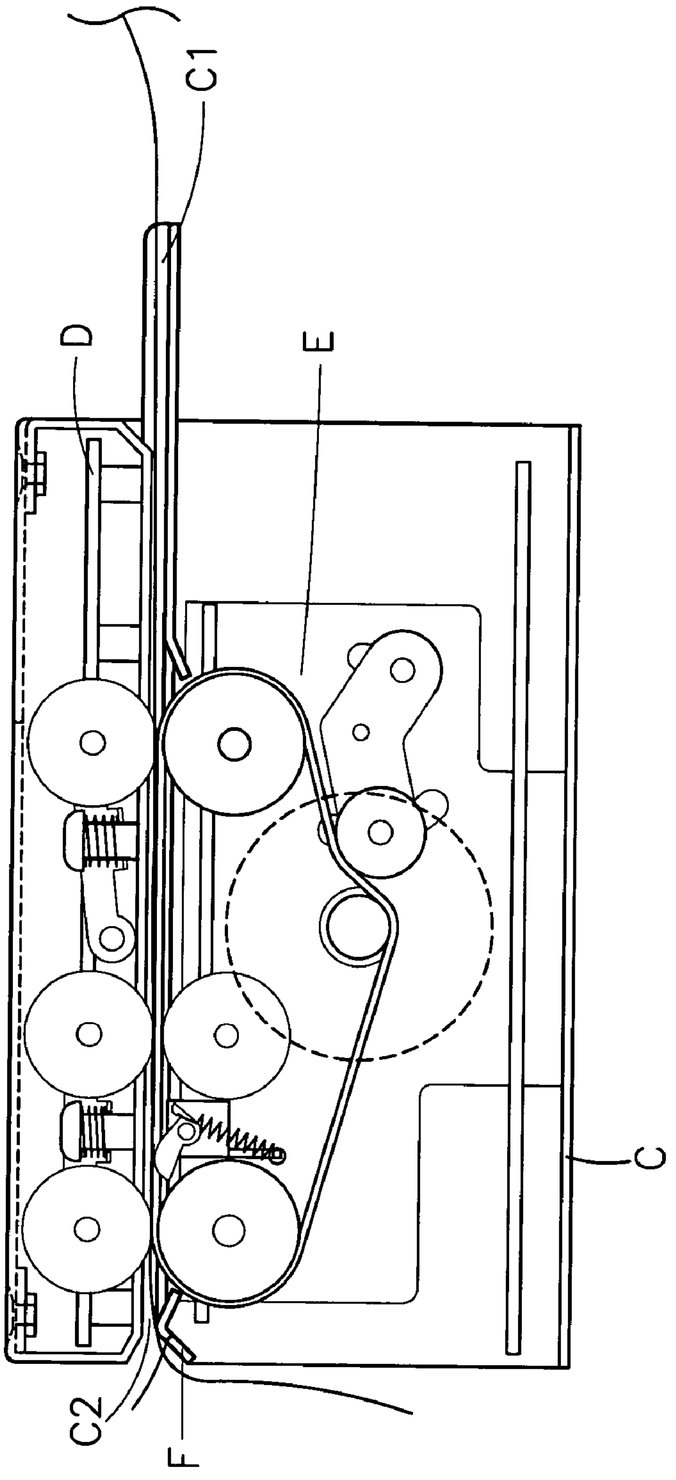
PRIOR ART FIG.5
FIG. 5 is a sectional view of a banknote receiver constructed according to the prior art.

Referring to FIGS. 4, 4A and 4B, the detector unit 3 is mounted in the lower chamber 10 of the housing 1. When the upper base 31 and the lower base 32 aligned in the lower chamber 10 of the housing 1, the detector unit 3 scans the authenticity of banknote inserted into the insertion slot 111.

When the authenticity of inserted banknote verified, inserted banknote is delivered through the angled passage 30 to the banknote inlet 21 of the banknote storage cabinet 20 to force the curved pawls 232 of the burglarproof spring member 23 backwards, and therefore the curved pawls 232 are deformed to let banknote pass. When banknote passed into the banknote inlet 21 of the banknote storage cabinet 20, the curved pawls 232 immediately return to their former shape to prohibit reverse movement of received banknote. Therefore, any body trying to pull back inserted banknote with a cord member, tape or metal string cannot succeed.

Further, because the passage 30 is a substantially L-shaped passage, the banknote transferring surface and the insertion slot 111 are not on the same plane. This special feature effectively achieves the desired burglarproof function. Further, the burglarproof spring member 23 can be made of metal, plastics, or any of a variety of suitable elastic materials. Because the component parts of the banknote receiver are simple, the manufacturing cost of the banknote receiver is low and, the assembly process of the banknote receiver is simple.

A prototype of banknote receiver has been constructed with the features of the annexed drawings of FIGS. 1~4. The banknote receiver functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A banknote receiver comprising a housing, said housing comprising an insertion slot in a face panel thereof, a detector unit mounted in said housing and adapted to detect the authenticity of banknote inserted into said insertion slot, and a banknote storage cabinet adapted to receive banknote verified by said detector unit, said banknote storage cabinet having an elongated banknote inlet, wherein said detector unit comprises an upper base, a lower base, an angled passage defined between said upper base and said lower base for guiding inserted banknote from said insertion slot toward said banknote storage cabinet; said banknote storage cabinet comprises a burglarproof spring member disposed adjacent to said banknote inlet and adapted to stop backward movement of banknote being delivered into said banknote inlet, said burglarproof spring member having a plurality of curved pawls projecting into said angled passage to limit movement of banknote in said angled passage in one direction toward said banknote inlet.

2. The banknote receiver as claimed in claim 1, wherein said lower base of said detector unit comprises at least one burglarproof hook disposed adjacent to said angled passage and controlled to stop banknote from reverse movement.

3. The banknote receiver as claimed in claim 1, wherein said lower base further comprises sensor means adapted to detect the presence of banknote in said angled passage.

4. The banknote receiver as claimed in claim 1, wherein said housing comprises a chamber adapted to accommodate said detector unit, said chamber having a plurality of hook holes symmetrically disposed in two opposite side panels thereof; said upper base comprises a plurality of spring books symmetrically disposed at two sides and respectively hooked in the hook holes of said chamber of said housing.

5. The banknote receiver as claimed in claim 1, wherein said housing comprises a conveyer adapted to transfer inserted banknote from said angled passage to said banknote storage cabinet, said conveyer comprising two conveying belts, a plurality of wheel holders coupled between said conveying belts, and a plurality of idle wheels respectively pivoted to said wheel holders, and an impression mechanism adapted to hold down banknote being transferred by said conveyer.

6. The banknote receiver as claimed in claim 1, wherein said burglarproof spring member of said banknote storage cabinet is made of elastic material.

7. The banknote receiver as claimed in claim 1, wherein said banknote storage cabinet comprises an elongated locating hole extended along a top side of said banknote inlet; said burglarproof spring member comprises an elongated base fastened to said elongated locating hole of said banknote storage cabinet.

8. The banknote receiver as claimed in claim 7, wherein said curved pawls of said burglarproof spring member are suspended from said elongated base of said burglarproof spring member and obliquely extending in direction toward said banknote inlet.

9. The banknote receiver as claimed in claim 1, wherein said lower base further comprises sensor means adapted to detect the presence of banknote in said angled passage.

10. A banknote receiver comprising a housing, said housing comprising an insertion slot in a face panel thereof, a detector unit mounted in said housing and adapted to detect the authenticity of banknote inserted into said insertion slot, and a banknote storage cabinet adapted to receive banknote verified by said detector unit, said banknote storage cabinet having an elongated banknote inlet, wherein said detector unit comprises an upper base, a lower base, an angled passage defined between said upper base and said lower base disposed adjacent to said banknote inlet and adapted to stop backward movement of banknote being delivered into said banknote inlet, said burglarproof spring member having a plurality of curved pawls projecting into said angled passage to limit movement of banknote in said angled passage in one direction toward said banknote inlet, wherein said curved pawls of said burglarproof spring member are suspended from an elongated base of said burglarproof spring member and obliquely extending in direction toward said banknote inlet.

11. The banknote receiver as claimed in claim 10, wherein said lower base of said detector unit comprises at least one burglarproof hook disposed adjacent to said angled passage and controlled to stop banknote from reverse movement.

12. The banknote receiver as claimed in claim 10, wherein said housing comprises a chamber adapted to accommodate said detector unit, said chamber having a plurality of hook holes symmetrically disposed in two opposite side panels thereof; said upper base comprises a plurality of spring hooks symmetrically disposed at two sides and respectively booked in the hook holes of said chamber of said housing.

13. The banknote receiver as claimed in claim 10, wherein said housing comprises a conveyer adapted to transfer inserted banknote from said angled passage to said banknote storage cabinet, said conveyer comprising two conveying belts, a plurality of wheel holders coupled between said conveying belts, and a plurality of idle wheels respectively pivoted to said wheel holders, and an impression mechanism adapted to hold down banknote being transferred by said conveyer. respectively pivoted to said wheel holders, and an impression mechanism adapted to hold down banknote being transferred by said conveyer.

14. The banknote receiver as claimed in claim 10, wherein said burglarproof spring member of said banknote storage cabinet is made of elastic material.

15. The banknote receiver as claimed in claim 10, wherein said banknote storage cabinet comprises an elongated locating bole extended along a top side of said banknote inlet to fastened with said elongated base of said burglarproof spring member.

16. A banknote receiver comprising a housing, said housing comprising an insertion slot in a face panel thereof, a detector unit mounted in said housing and adapted to detect the authenticity of banknote inserted into said insertion slot, and a banknote storage cabinet adapted to receive banknote verified by said detector unit, said banknote storage cabinet having an elongated banknote inlet, wherein said detector unit comprises an upper base, a lower base, an angled passage defined between said upper base and said lower base for guiding inserted banknote from said insertion slot toward said banknote storage cabinet; said banknote storage cabinet comprises a burglarproof spring member disposed adjacent to said banknote inlet and adapted to stop backward movement of banknote being delivered into said banknote inlet, said burglarproof spring member having a plurality of curved pawls projecting into said angled passage to built movement of banknote in said angled passage in one direction toward said banknote inlet, wherein said housing comprises a chamber adapted to accommodate said detector unit, said chanter having a plurality of hook holes symmetrically disposed in two opposite side panels thereof, said upper base comprises a plurality of spring hooks symmetrically disposed at two sides and respectively hooked in the hook boles of said chamber of said housing.

17. The banknote receiver as claimed in claim 16, wherein said lower base of said detector unit comprises at least one burglarproof hook disposed adjacent to said angled passage and controlled to stop banknote from reverse movement.

18. The banknote receiver as claimed in claim 16, wherein said lower base further comprises sensor means adapted to detect the presence of banknote in said angled passage.

19. The banknote receiver as claimed in claim 16, wherein said burglarproof spring member of said banknote storage cabinet is made of elastic material.

20. The banknote receiver as claimed in claim 16, wherein said banknote storage cabinet comprises an elongated locating hole extended along a top side of said banknote inlet; said burglarproof spring member comprises an elongated base fastened to said elongated locating hole of said banknote storage cabinet.

* * * * *